United States Patent
Okura et al.

(10) Patent No.: US 9,644,453 B2
(45) Date of Patent: May 9, 2017

(54) BALL SEALER FOR HYDROCARBON RESOURCE COLLECTION AS WELL AS PRODUCTION METHOD THEREFOR AND DOWNHOLE TREATMENT METHOD USING SAME

(71) Applicant: Kureha Corporation, Tokyo (JP)

(72) Inventors: Masayuki Okura, Tokyo (JP); Hiroyuki Sato, Tokyo (JP)

(73) Assignee: KUREHA CORPORATION, Tokyo (JP)

(*) Notice: Subject to any disclaimer, the term of this patent is extended or adjusted under 35 U.S.C. 154(b) by 0 days.

(21) Appl. No.: 14/407,091

(22) PCT Filed: Aug. 5, 2013

(86) PCT No.: PCT/JP2013/071121
§ 371 (c)(1),
(2) Date: Dec. 11, 2014

(87) PCT Pub. No.: WO2014/024837
PCT Pub. Date: Feb. 13, 2014

(65) Prior Publication Data
US 2015/0144348 A1    May 28, 2015

(30) Foreign Application Priority Data
Aug. 8, 2012    (JP) ................. 2012-176350

(51) Int. Cl.
*E21B 34/14*    (2006.01)
*E21B 43/26*    (2006.01)
(Continued)

(52) U.S. Cl.
CPC ........ *E21B 34/14* (2013.01); *B29C 45/14073* (2013.01); *E21B 43/26* (2013.01);
(Continued)

(58) Field of Classification Search
CPC ........ E21B 34/14; E21B 43/26; E21B 43/261; B29C 45/14073; B29C 45/14081; B29K 2067/043; B29K 2105/21; B23B 27/00
See application file for complete search history.

(56) References Cited

U.S. PATENT DOCUMENTS 4,505,334 A * 3/1985 Doner ................. E21B 33/138
156/170
4,716,964 A    1/1988 Erbstoesser et al.
(Continued)

FOREIGN PATENT DOCUMENTS

CN    1572454 A    2/2005
CN    201144682 Y    11/2008
(Continued)

OTHER PUBLICATIONS

International Search Report of PCT/JP2013/071121 dated Oct. 29, 2013.
(Continued)

*Primary Examiner* — Brad Harcourt
*Assistant Examiner* — Christopher Sebesta
(74) *Attorney, Agent, or Firm* — Oliff PLC (57) ABSTRACT

A ball sealer for hydrocarbon resource recovery, comprising: a generally spherical entire structure including at least two layers of a spherical core and a surface resin layer covering the spherical core, of which at least the surface resin layer comprises a polyglycolic acid resin; and having a diameter of at least about 25 mm (1 inch). The ball sealer is produced through a process comprising the steps of: disposing a spherical core by a support pin at a substantially central position within a mold cavity, injecting a surface resin comprising a polyglycolic acid resin into the cavity surrounding the spherical core, causing the support pin to retreat up to a wall surface of mold cavity in synchronism with a completion of the injection of the surface resin, and (Continued)

then hardening the surface resin. As a result, it is possible to produce a large-diameter ball sealer suitable for use in the hydraulic fracturing process (hydraulic fracturing) widely used for recovery of hydrocarbon resources by using a polyglycolic acid resin which is a biodegradable resin having good mechanical strengths and a good size designability at least as a surface-forming resin, through relatively simple steps and with good dimensional accuracy.

4 Claims, 2 Drawing Sheets

(51) Int. Cl.
  *B29C 45/14* (2006.01)
  *B32B 27/00* (2006.01)
  *B29K 67/00* (2006.01)
  *B29K 105/12* (2006.01)
  *B29L 9/00* (2006.01)
  *B29L 31/26* (2006.01)
  *B29L 31/00* (2006.01)

(52) U.S. Cl.
  CPC .... *B29K 2067/043* (2013.01); *B29K 2105/12* (2013.01); *B29K 2995/006* (2013.01); *B29L 2009/00* (2013.01); *B29L 2031/26* (2013.01); *B29L 2031/7734* (2013.01); *B32B 27/00* (2013.01); *E21B 43/261* (2013.01); *Y10T 428/31786* (2015.04)

(56) References Cited

U.S. PATENT DOCUMENTS

| | | | |
|---|---|---|---|
| 7,093,664 B2 | 8/2006 | Todd et al. | |
| 7,353,879 B2 | 4/2008 | Todd et al. | |
| 7,452,849 B2 | 11/2008 | Berry et al. | |
| 7,621,336 B2 | 11/2009 | Badalamenti et al. | |
| 7,647,964 B2 | 1/2010 | Akbar et al. | |
| 7,762,342 B2 | 7/2010 | Richard et al. | |
| 8,291,980 B2 | 10/2012 | Fay | |
| 8,499,841 B2 | 8/2013 | Tinker | |
| 8,714,250 B2 | 5/2014 | Baser et al. | |
| 2003/0176239 A1 | 9/2003 | Tzivanis et al. | |
| 2004/0253334 A1 | 12/2004 | Bandoh et al. | |
| 2005/0205265 A1 | 9/2005 | Todd et al. | |
| 2005/0205266 A1 | 9/2005 | Todd et al. | |
| 2007/0169935 A1 | 7/2007 | Akbar et al. | |
| 2008/0060813 A1 | 3/2008 | Badalamenti et al. | |
| 2009/0101334 A1* | 4/2009 | Baser | E21B 43/26 166/193 |
| 2009/0298979 A1 | 12/2009 | Sato et al. | |
| 2010/0132959 A1 | 6/2010 | Tinker | |
| 2011/0036592 A1 | 2/2011 | Fay | |
| 2011/0123744 A1* | 5/2011 | Sato et al. | B32B 27/36 428/36.6 |
| 2011/0127047 A1* | 6/2011 | Themig | E21B 34/063 166/386 |
| 2011/0132619 A1* | 6/2011 | Agrawal | E21B 23/04 166/376 |
| 2011/0177295 A1 | 7/2011 | Wang | |
| 2011/0226479 A1 | 9/2011 | Tippel et al. | |
| 2012/0139144 A1* | 6/2012 | Tutmark | B29C 33/123 264/40.5 |
| 2012/0181032 A1* | 7/2012 | Naedler | E21B 43/26 166/308.1 |
| 2012/0214715 A1* | 8/2012 | Luo | C09K 8/50 507/260 |
| 2012/0273229 A1* | 11/2012 | Xu | B22F 7/06 166/376 |
| 2013/0081821 A1* | 4/2013 | Liang | C08J 3/201 166/311 |
| 2014/0246209 A1* | 9/2014 | Themig | E21B 33/12 166/374 |

FOREIGN PATENT DOCUMENTS

| | | |
|---|---|---|
| CN | 101316877 A | 12/2008 |
| CN | 102337862 A | 2/2012 |
| CN | 102555151 A | 7/2012 |
| EP | 2766561 A1 | 8/2014 |
| JP | 2005534746 A | 11/2005 |
| JP | 2008-088364 A | 4/2008 |
| JP | 2011-148290 A | 8/2011 |
| JP | 2012-120834 A | 6/2012 |
| NO | 2007/060981 A1 | 5/2007 |
| WO | WO2004/013251 A1 | 2/2004 |
| WO | WO/2004/011530 A1 | 2/2004 |
| WO | 2013053057 A1 | 4/2013 |

OTHER PUBLICATIONS

Mar. 7, 2016 Search Report issued in European Application No. 13828146.4.

Oct. 31, 2016 Office Action issued in European Patent Application No. 13828146.4.

Nov. 7, 2016 Office Action issued in Chinese Patent Application No. 201380025147.X.

Jan. 31, 2017 Office Action issued in Japanese Patent Application No. 2014-529485.

Jun. 2, 2016 Office Action issued in Chinese Application No. 201380025147.X.

\* cited by examiner

BALL SEALER FOR HYDROCARBON RESOURCE COLLECTION AS WELL AS PRODUCTION METHOD THEREFOR AND DOWNHOLE TREATMENT METHOD USING SAME

TECHNICAL FIELD

The present invention relates to a ball sealer as a kind of tools for formation or repair of downholes (wellbores) for recovery of hydrocarbon resources including oil and gas, particularly a ball sealer (so-called "frac ball") suitable for formation of frac plugs or frac sleeves (that is, plugs or sleeves for hydraulic fracturing), a process for production thereof, and a method of processing wellbores using the ball sealer.

BACKGROUND ART

Downholes (underground drilling pits or wellbores) are prepared for recovery of hydrocarbon resources including oil and gas (representatively called "oil" sometimes hereafter) from the underground, and tools for the formation or repair of the downholes, such as frac plugs, bridge plugs, cement retainers, perforation guns, ball sealers, sealing plugs, and packers (inclusively referred to as "downhole tools" hereafter), are used and thereafter disintegrated or allowed to fall down as they are in many cases without recovery thereof onto the ground. (Examples of such downhole tools and manners of use thereof are illustrated in, e.g., Patent documents 1-7). Therefore, about the tool of such temporary use, it has been recommended to form the whole or a component thereof constituting a bonding part allowing collapse (i.e. downhole tool member) with a degradable polymer. Examples of such a degradable polymer, may include: polysaccharide, such as starch or dextrin; animal albumin polymers, such as chitin and chitosan; aliphatic polyesters, such as polylactic acid (PLA, typically poly L-lactic acid (PLLA)), polyglycolic acid (PGA), polybutyric acid, and polyvaleric acid; and further, polyamino acids, polyethylene oxide, etc. (Patent documents 1 and 2).

In order to recover hydrocarbon resources (as represented by "oil") from surrounding formation through the thus-formed downholes, hydraulic fracturing (hydraulic pressure or stream crushing process) is frequently adopted.

Conventional ball sealers as mentioned above as an example of downhole tools used in such a hydraulic fracturing process, have been used in many cases as sealers or fillers for directly filling perforations which were formed in the formation by using perforating gun, etc., for recovery of oils, in order to suppress the entering of excessive amount of work water into the perforations (for example, Patent document 6). Ball sealers used for such purposes generally comprised nondegradable materials, inclusive of nondegradable resins, such as nylon or phenolic resin, or aluminum, if needed, coated with rubbery surface layers for improving the sealing performances, and were of relatively small sizes, e.g., diameters of 16-32 mm (⅝ inch-1.25 inches, as disclosed at col. 2, lines 46-48 of Patent document 6).

In recent years, however, use of ball sealers having larger diameters as a part of members forming frac plugs or frac sleeves (plugs or sleeves for hydraulic fracturing) used in the hydraulic fracturing process is also proposed. More specifically, a high-pressure stream is introduced into an operation region defined by disposing a frac plug formed by a ball sealer together with a ball sealer at a predetermined position along a downhole prepared in advance to urge a water stream in a direction perpendicular to the downhole to fracture the formation, thereby forming perforations for recovering oils (e.g., Patent documents 1 and 2).

Alternatively, there has been also proposed a method of inserting into a downhole a tube (frac sleeve) in which a plurality of ball seats have been disposed at predetermined intervals and successively performing cycles each including supplying and disposition of a ball sealer at a ball seat, and then introducing a high-pressure water stream for fracturing the formation to form a perforation in the frac sleeve (e.g., Patent document 7).

Such ball sealers (which are also called "frac balls") forming a part of such a frac plug or a frac sleeve, are required to have diameters of, e.g., 25-100 mm (1-4 inches) in many cases, which partly overlap with but are generally larger than the diameters of the above-mentioned ball sealers for directly sealing the perforations. However, if such a large-diameter ball sealer is manufactured by the heat compression molding or injection molding of not a conventional nondegradable material but of a biodegradable resin which is crystalline in general, a sink or a void is developed due to thermal contraction or contraction accompanying crystallization, so that it was difficult to produce such large-diameter balls with good dimensional accuracy required of the frac ball as a member for filling or liquid leakage-preventing member. For this reason, it has been a present state that the manufacture of such frac balls of comparatively large diameters with a biodegradable resin material has been resorted to a sequence of solidification extrusion cutting, which is very complicated and cost-incurring.

PRIOR ART DOCUMENTS

Patent Documents

[Patent document 1] US2005/0205266A
[Patent document 2] US2005/0205265A
[Patent document 3] US2009/0101334A
[Patent document 4] US7621336B
[Patent document 5] US7762342B
[Patent document 6] US7647964B
[Patent document 7] US2010/0132959A.

SUMMARY OF THE INVENTION

Problems to be Solved by the Invention

In view of the above-mentioned conventional state of art, a principal object of the present invention is to provide a production process capable of forming a ball sealer of a relatively large diameter with good dimensional accuracy from a polyglycolic acid resin which is a biodegradable resin with good mechanical strength through relatively simple steps, and also a ball sealer for hydrocarbon resource recovery produced as a result thereof.

A further object of the present invention is to provide a method of processing a wellbore using the above-mentioned ball sealer for hydrocarbon resource recovery.

Means for Solving the Problems

The ball sealer for hydrocarbon resource recovery of the present invention comprises: a generally spherical entire structure including at least two layers of a spherical core and a surface resin layer covering the spherical core, of which at least the surface resin layer comprises a polyglycolic acid resin; and having a diameter of at least about 25 mm (1 inch).

Moreover, the process for producing a ball sealer of the present invention comprises the steps of: disposing a spherical core by a support pin at a substantially central position within a mold cavity, injecting a surface resin comprising a polyglycolic acid resin into the cavity surrounding the spherical core, causing the support pin to retreat up to a wall surface of mold cavity in synchronism with a completion of the injection of the surface resin, and then hardening the surface resin.

A brief description will be made about a history through which the present inventors have studied with the above mentioned object to arrive at the present invention. Among aliphatic polyester resins showing biodegradability, polyglycolic acid (PGA) resin shows outstanding mechanical strength including an especially large compression strength and, even from this point alone, can be said to have an extremely excellent characteristic for providing a ball sealer which is built in a frac plug or a frac sleeve together with a ball seat to function as a supporting seal member for intercepting a high-pressure water stream in fracturing (namely, a frac ball). Furthermore, as notably different characteristics from other aliphatic polyester resins, such as polylactic acid (PLLA), PGA resin shows a thickness reduction velocity in water which is constant with time (in other words, a linear thickness reduction rate (details of which are disclosed in WO2013/183363A), and also characteristics of, when an inorganic or organic short-fiber reinforcement material is blended therewith, the initial thickness reduction rate is suppressed notably, the suppression period is controllable by the aspect ratio (L/D) of the short-fiber reinforcement material, and the terminal thickness reduction rate after a certain degree (e.g., 50%) of thickness reduction increases notably compared with the initial thickness reduction rate (the details being disclosed in WO2014/010267A). These characteristics mean that the PGA resin shows extremely excellent characteristics for size designing of temporarily used downhole tool members including a ball sealer, depending on the situation of use thereof.

However, the formation of PGA resin into a large sphere of about 25 mm or more in diameter, suitable as a frac ball, by the heat compression molding or the injection molding was very difficult because of heat shrinkage after the molding, and also a very large shrinkage during crystallization (solidification) due to a crystallinity corresponding to the moisture barrier property which gives the linear thickness reduction rate characteristic in water, so that the formation of a frac ball requiring a high dimensional accuracy was difficult. However, noting that the characteristics of PGA resin associated with the high rigidity and compression strength required of a frac ball are expected to be satisfied by the formation of only a surface portion of a frac ball with a PGA resin, the present inventors thought that the shrinkage accompanying the solidification of the PGA resin would not result in lowering in size accuracy unsuitable for an outer shape of a frac ball product, if the entire frac ball is not formed in one shot of solidification but only the surface layer is formed by solidification. Then, the present inventors confirmed that a large-diameter frac ball of which at least the surface layer comprised a PGA resin could be formed with good size accuracy by using a process similar to an insert molding process which had been applied to surface layer-molding of a golf ball with a rubbery resin which is contrastive with a crystalline resin, thus arriving at the present invention.

Moreover, the method of processing a wellbore of the present invention comprises: a cycle of steps including:

feeding a ball sealer along with a working fluid to a ball seat which has an aperture and has been disposed at a predetermined position in an elongated frac sleeve inserted into a wellbore formed in a formation, thereby sealing the aperture to form a seal section for intercepting the working fluid; and causing the working fluid to flush through a hole formed in a frac sleeve wall at a predetermined position right above the seal section, thereby digging a wellbore inner wall adjacent to the hole to form a perforation thereat; and then decomposing the frac ball in its place, wherein the frac ball comprises the above-mentioned ball sealer according to the present invention.

According to a preferred embodiment, the wellbore processing method, comprises: disposing a plurality of ball seats at predetermined intervals in an elongated frac sleeve inserted into a wellbore, the plurality of ball seats having respective apertures of respective diameters increasing gradually from a downstream side to an upstream side of the frac sleeve; and inserting an elongated frac sleeve into a wellbore; and feeding into the frac sleeve a work fluid and a plurality of frac balls having successively increasing diameters to perform fracturing cycles each including formation of a seal section and formation of a perforation in a wellbore inner wall successively from the downstream side, wherein at least a portion of the plurality of frac balls comprises the above-mentioned ball sealer according to the present invention.

EMBODIMENTS OF THE INVENTION

Hereinafter, the present invention will be described in detail based on preferred embodiments thereof.
(Polyglycolic Acid Resin)

The surface layer of the ball sealer for hydrocarbon resource recovery (frac ball) of the present invention is formed of polyglycolic acid resin. Polyglycolic acid resin is particularly preferably used because it has excellent initial strengths as represented by its compression strength, which is at the highest level among thermoplastic resins, and also a large effect of suppressing in-water thickness reduction rate when formed as a composite material by incorporation of short-fiber reinforcement material. Polyglycolic acid resin used in the present invention may include glycolic acid homopolymer (namely, polyglycolic acid (PGA)) consisting only of a glycolic acid unit ($-OCH_2-CO-$) as a recurring unit, and also a glycolic acid copolymer which includes other monomer (comonomer) units, such as hydroxycarboxylic acid units, preferably lactic acid units, in a proportion of at most 50 wt. %. preferably at most 30 wt. %, further preferably at most 10 wt. %. The hydrolysis rate, crystallinity, etc., of polyglycolic acid resin can be modified to some extent by converting it into a copolymer including another monomer unit.

Polyglycolic acid resin having a weight-average molecular weight (Mw) of at least 70,000, preferably 70,000-500,000, is used. If the weight-average molecular weight is below 70,000, the initial strength characteristics required of a frac ball is impaired. On the other hand, if the weight-average molecular weight exceeds 500,000, the polyglycolic acid resin is liable to have undesirably inferior molding and processing characteristics. Moreover, in consideration of the injection-molding characteristic, it is preferred to use one exhibiting a melt viscosity (JIS-K7199) in the range of 20 to 2000 Pa-s, preferably 200-1500 Pa-s, when measured under the conditions of a shear rate of 120-$sec^{-1}$ at a temperature which is the melting point plus 50 (that is, 270 in the case of polyglycolic acid alone).

In order to obtain polyglycolic acid resin of such a molecular weight or a melt viscosity, rather than polymerization of glycolic acid, it is preferred to adopt a process of subjecting glycolide which is a dimer of glycolic acid to ring-opening polymerization in the presence of a small amount of catalyst (cation catalyst, such as organo-tin carboxylate, tin halide, or antimony halide) and substantially in the absence of a solvent (namely, under bulk polymerization conditions) under heating at temperatures of about 120-250. Accordingly, in case of forming a copolymer, it is preferred to use as a comonomer one or more species of lactides, as represented by lactide which is a dimer of lactic acid, and lactones (e.g., caprolactone, beta-propiolactone, beta-butyro-lactone).

Incidentally, the melting point (Tm) of polyglycolic acid resin is generally 200 or higher. For example, polyglycolic acid has a melting point of about 220, a glass transition temperature of about 38, and a crystallization temperature of about 90. However, the melting point of the polyglycolic acid resin can vary to some extent depending on the molecular weight thereof, comonomer species, etc.

Although the frac ball of the present invention includes a surface resin which is usually composed of the polyglycolic acid resin alone, it is also possible to blend another thermoplastic resin, such as another aliphatic polyester, an aromatic polyester, or an elastomer, for the purpose of controlling the degradability, etc. However, the blending amount thereof should be suppressed in amount not obstructing the presence of the polyglycolic acid resin as the matrix resin required to exhibit a linear thickness reduction rate, i.e., less than 30 wt. %, preferably less than 20 wt. %, more preferably less than 10 wt. %, of the polyglycolic acid resin.

(Short-Fiber Reinforcement Material)

It is also preferred to blend a short-fiber reinforcement material with the PGA resin which constitutes the surface of the frac ball of the present invention. Thereby, as mentioned above, it is also possible to attain the effect of suppressing the initial thickness reduction rate in comparison with the PGA-resin alone, in addition to a reinforcing effect. The short-fiber reinforcement material may comprise an inorganic or organic fiber reinforcement material, such as glass fiber, carbon fiber, boron fiber, aramid fiber, liquid crystal polymer fiber, and cellulosic fiber (e.g., Kenaf fiber). Among these fiber reinforcement materials, it is preferred to use one that has a shorter-axis diameter (D) of 0.1-1000 □m, more preferably 1-100 □m, particularly preferably 5-20 □m, and an aspect ratio (L/D) of 2-1000, more preferably 3-300, particularly preferably 3-150, and that is usually called a milled fiber or a chopped fiber. A shorter diameter (D) of less than 0.1 □m is liable to fail in providing a sufficient strength for delaying the collapse and a shorter-axis diameter in excess of 1000 □m is liable to result in non-uniform collapse behavior of the shaped body. An aspect ratio (L/D) of less than 2 fails in providing the effect of collapse delay, and in excess of 1000, it becomes difficult to uniformly disperse the short-fiber reinforcement material uniformly by melt-kneading. There has been also observed a tendency that a larger aspect ratio (L/D) results in an increased initial suppression period of thickness reduction rate, whereby it is possible to control, i.e., increase or decrease, the initial suppression period of thickness reduction rate, to some extent.

In case of being used, the short-fiber reinforcement material may preferably be incorporated at a rate of 1-50 wt. parts, more preferably 5-45 wt. parts, particularly preferably 10-40 wt. parts, per 100 wt. parts of polyglycolic acid resin. Less than 1 wt. part fails in developing a sufficient strength for delaying the collapse, and in excess of 50 wt. parts, the uniform dispersion through melt-kneading of the short-fiber reinforcement material is liable to be difficult. If the incorporation amount of the short-fiber reinforcement material is increased within the above-mentioned range, there is observed a tendency that the initial suppression period of thickness reduction rate is increased, so that in combination with the above-mentioned aspect ratio, it becomes possible to control, i.e., increase or decrease, the initial suppression period of thickness reduction rate.

(Powdery Reinforcement Material)

It is also desirable to use a reinforcement material in a powdery form (in a sense of including particle form) in place of or in addition to the short-fiber reinforcement material. The powdery reinforcement material may preferably comprise powder of inorganic materials, such as mica, silica, talc, alumina, kaolin, calcium sulfate, calcium carbonate, titanium oxide, ferrite, clay, glass powder, zinc oxide, nickel carbonate, iron oxide, lime powder, magnesium carbonate or barium sulfate, having a median particle size (a particle size giving a cumulative weight of 50% counted from either a smaller or larger particle size side) of about 0.1 □m to 1 mm, particularly 1 to 100 □m. Compared with short-fiber reinforcement materials, these powdery reinforcement materials provide the shaped products with a similar compression strength-enhancement effect and a better dimensional stability while the effect of delaying the decomposition is scarce.

These powdery reinforcement materials can be used in two or more species in combination, and can also be used together with a short-fiber reinforcement material. The amount of addition (a total amount when used together with a short-fiber reinforcement material) is 5 to 70 wt. %, preferably 10 to 60 wt. %, more preferably 15 to 50 wt. %, further preferably 20 to 40% of the total amount of the compound including the resin material.

It is also preferred that the short-fiber reinforcement material or the powdery reinforcement material is processed by a sizing agent or a surface-treating agent, and then mixed with the resin material. The sizing agent or surface-treating agent may comprise, e.g., a functional compound, such as an epoxy compound, an isocyanate compound, a silane compound, or a titanium compound. These compounds may be applied to the reinforcement material as a binding treatment or a surface treatment beforehand, or may be added together with the reinforcement material simultaneously at the time of preparation of a resin composition. The reinforcement material can also be directly melt-kneaded with the whole amount of the polyglycolic acid resin constituting a shaped body but, if desired, polyglycolic acid resin composition (master batch) having a higher concentration of the reinforcement material is prepared beforehand and is diluted with an additional amount of polyglycolic acid resin to provide a resin material having a desired concentration of the reinforcement material. From the viewpoint of uniform dispersibility of the reinforcement material, it is preferred that the polyglycolic acid resin is melt-kneaded with the reinforcement material (and other fillers) to prepare a pelletized resin material beforehand, which is then supplied to the molding.

Figure 1:
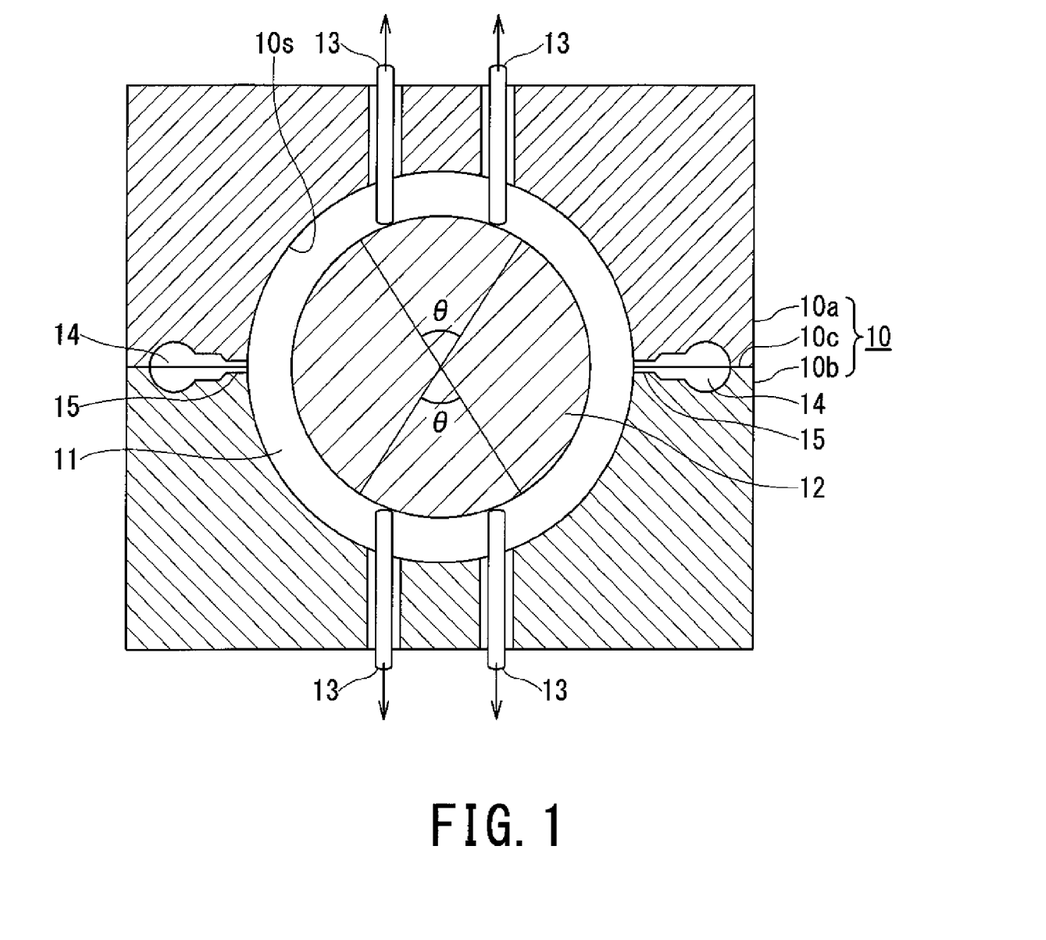
FIG. 1 is a schematic cross section of a mold in an intermediate stage of frac-ball production by a process of the present invention.

The frac ball of the present invention may preferably be produced by the process of the present invention based on the insert-molding method. FIG. 1 is a schematic cross section of a mold 10 in an intermediate stage of the process of the present invention. A spherical core 12 which has been disposed in a mold cavity 11 in an open state of a mold 10 including an upper mold 10a and a lower mold 10b is, in a closed state of the mold formed by joining at an interface 10c, held by a plurality of support pins 13 projected from the upper and lower sides as shown in FIG. 1. In this state, PGA resin in a molten state is injected through a runner 14 and a gate 15 of the mold into the mold cavity 11, and, in synchronism with the completion of injection (namely, almost simultaneous with or just before the completion of injection), the front ends of the two or more support pins 13 are retreated from the respective illustrated core-supporting positions in arrow directions so as to almost complete the retreatment to the position on an inner surface 10s of the mold at the time of completion of the injection.

Then, the shaped body is cooled and is caused to crystallize within the mold. The mold temperature can be any temperature below the melting point but may preferably be 50-150 from viewpoints of cooling rate and crystallization rate. A temperature below 50 is accompanied with problems such as excessively rapid cooling leading to failure of uniform spreading of the resin at the time of the injection and failure of uniform property due to a smaller crystallinity of an outer portion than the inner portion. A temperature above 150 requires a long cooling period due to slow crystallization rate.

Then, the mold is opened wide and the laminate molded body is taken out. If needed, the shaped body may be water-cooled for slight cooling down. Moreover, removal of a residual strain and equalization of crystallinity can be performed by carrying out heat treatment at 100-200 for several minutes to several hours, if needed. Furthermore, a finishing treatment for providing a smooth surface may preferably be performed, as needed, e.g., by polishing for removal of some unevenness corresponding to the gate 15, some unevenness which can remain at parts corresponding to support-pins 13, and unevenness corresponding to the parting line at the interface 10c.

The number of the support pins 13 may preferably be about 3-20, particularly about 3-12, for each of the upper mold 10a and the lower mold 10b. Respective support pins are desirably disposed so that the front ends thereof may touch points preferably within an upper surface region or a lower surface region of the spherical core forming a central angle □ of 90 degrees. Each support pin may preferably have a shape of a cylindrical bar having a spherical or slightly elliptical section of about 0.5-15 mm².

Thus, the frac ball of the present invention is formed by forming a surface layer of the above-mentioned PGA resin on the spherical core into a generally spherical shaped body, as a whole, having a diameter of at least about 25 mm (1 inch), preferably at least about 32 mm (1.25 inches), particularly preferably at least about 38 mm (1.5 inches). The upper limit of the diameter is generally at most about 127 mm (5 inches), preferably at most about 102 mm (4 inches).

Herein, the term "generally spherical" means that an ellipse having a shorter axis/longer axis ratio of at least 0.5, preferably at least 0.8, particularly at least 0.9, is not excluded.

The spherical core can also comprise PGA resin, but it is also possible that only the surface layer governing the property of a frac ball of the frac ball is formed of PGA resin, and the core is formed of other biodegradable resins, inclusive of, e.g., aliphatic polyesters other than PGA resin, such as polylactic acid (PLA, typically poly-L-lactic acid (PLLA)), polybutyric acid and polyvaleric acid; polysaccharides, such as starch and dextrin; animal protein polymers, such as chitin and chitosan; and further polyamino acid, polyethylene oxide, etc. Alternatively, it is also possible to use a hollow spherical core, as far as a consideration has been paid so as to retain mechanical strengths, as represented by a compression strength, of the entire frac ball.

To the surface layer-forming PGA resin and the spherical core-forming biodegradable resin, in addition to the short-fiber reinforcement material and powder reinforcement material mentioned above, it is further possible to add various additives, as desired, within an extent not adverse to the object of the present invention, inclusive of: thermal stabilizer, light stabilizer, plasticizer, desiccant, waterproofing agent, water repellent, lubricant, decomposition accelerator, decomposition retarder, impact modifier, resin improving agent; mold corrosion inhibitors, such as zinc carbonate and nickel carbonate; thermosetting resin, antioxidant, ultraviolet absorber, nucleating agent such as boron nitride, flame retarder; and colorants comprising pigments or dyes.

The surface-forming PGA resin layer may preferably have a thickness in the range of about 2.5-44 mm (0.1-1.75 inches), more preferably about 3.8-38 mm (0.15-1.5 inches), particularly about 5.1-32 mm (0.2-1.25 inches). At less than about 2.5 mm (0.1 inch), there is a possibility that the expected compression strength may not be obtained in case where only the surface layer is formed of the PGA resin, and also the shaping efficiency by insert molding may become worse. On the other hand, in excess of about 44 mm (1.75 inches), the effect of preventing the occurrence of a sink or void due to thermal contraction and contraction accompanying the crystallization achieved by the thickness suppression of the surface-forming PGA resin layer by the insert molding as an object of the present invention, will become scarce.

When the thickness of the PGA resin surface layer is restricted in molding the frac ball of the present invention as mentioned above, it is possible that the diameter of the spherical core exceeds the above-mentioned critical value (typically about 25 mm (1 inch)). In such a case, the spherical core itself can also be made into a laminated structure by the insert molding according to the present invention, wherein the surface resin in that case need not be made of PGA resin. In this case, the laminate core thus formed need not be finished with an excessive surface accuracy since it is expected to be coated with the PGA resin surface layer. Apart from the point of surface accuracy, the formation of such a large-diameter spherical core through a single step of injection molding is accompanied with problems, such as a degradation of the resin in the molding waiting state held in a molten state during successive molding and a degradation of the resin during an elongated cooling period, and therefore should desirably be avoided as far as possible.

Figure 2:
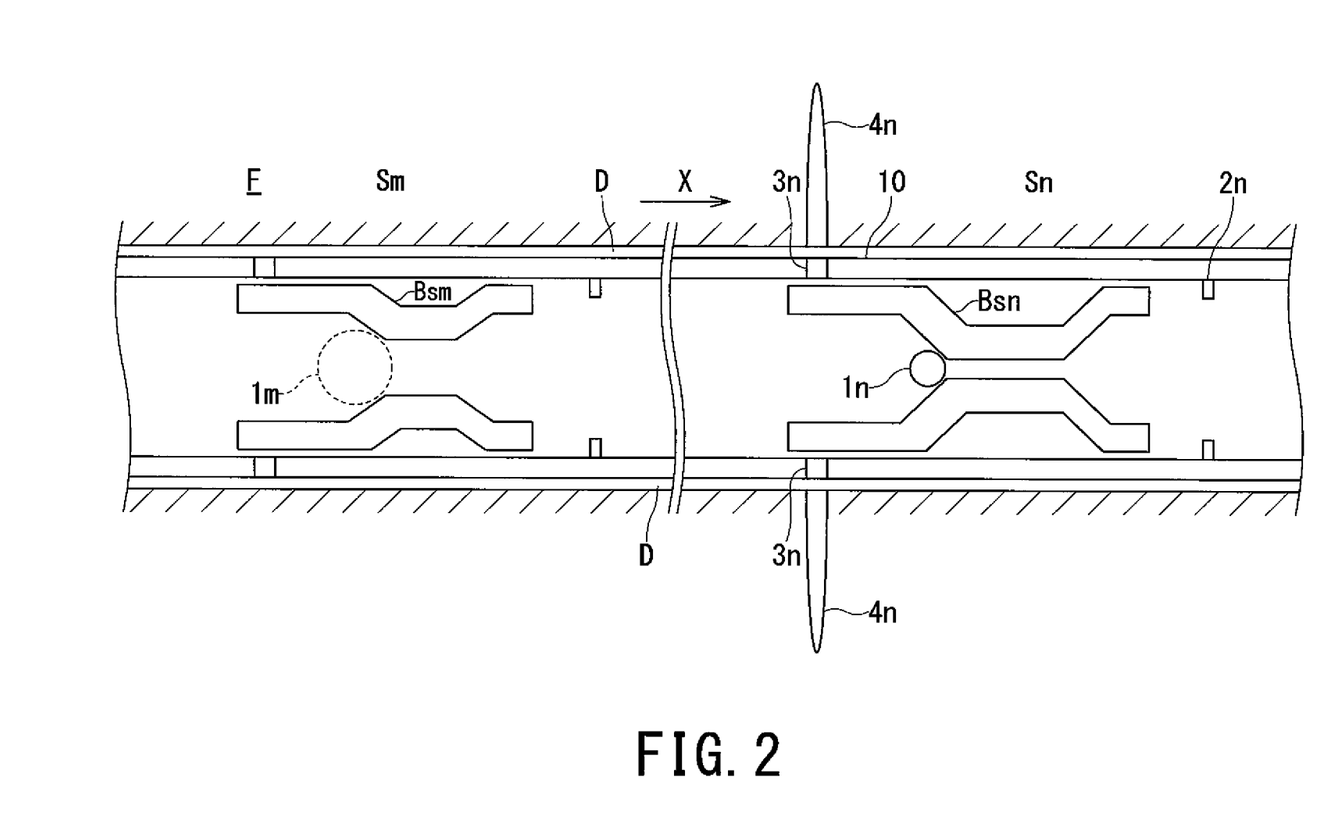
FIG. 2 is a sectional view of a downhole in which a frac sleeve has been inserted for explaining an example of fracturing work performed by using the frac sleeve having a ball sealer (frac ball) of the present invention incorporated therein.

According to one preferred mode of using the ball sealer for hydrocarbon resource recovery (frac ball) of the present invention, the ball sealer is used as a portion of frac balls having plural diameters incorporated in an elongated frac sleeve. A fracturing work using such an elongated frac sleeve is explained with reference to a figure. FIG. 2 is a partial sectional view of a frac sleeve 10 inserted into a downhole D formed in the formation F, and illustrates a ball seat Bsn disposed at an n-th region, and a ball seat Bsm disposed at an m-th region (m>n), respectively counted from the front end of the sleeve. In a fracturing operation using the frac sleeve, a ball 1n having a relatively small diameter is supplied along with a water stream introduced in a direction X in the sleeve to be disposed on a ball seat Bsn, and then a front end of the ball seat Bsn is moved to the position of a stopper 2n on the downstream due to the hydraulic pressure. As a result, flush ports 3n which have been covered with a rear end portion of the ball seat Bn are exposed, and a high-pressure water streams are flushed through the flush ports 3n to form perforations 4n at the region Sn. Subsequently, at a further upstream region Sm, a ball 1m having a large diameter than the ball 1n is supplied, and the above-mentioned fracturing work is continued. After a series of fracturing operations, frac balls left behind at regions . . . Bsn, . . . Bsm, . . . and so on, are expected to degrade and disappear after prescribed periods depending on the degradation characteristic of the component resin thereof in the operation environment.

Such a frac sleeve used in a manner as described above is required to be an elongated one having a length amounting to hundreds of meters as obtained by joining intermediate tubes in some cases. As a result, in order to perform continuously a series of fracturing operations by such an elongated frac sleeve, a group of many frac balls of different diameters, inclusive of from about 12.7 mm (0.5 inch) on a smaller side to about 127 mm (5 inches) on a lager side, may be required in some cases. Accordingly, a preferred application embodiment of the present invention may be to provide a set of a plurality of frac balls having different diameters in a range of about 12.7 mm (0.5 inch)-about 12.7-mm (5 inches) mm, including a portion, preferably at least a half (and not all), of the plurality, being the frac balls of the present invention which have a diameter of at least about 25 mm (1 inch) and the laminate structure. The remaining smaller diameter-side frac balls may preferably be single-layered balls comprising polyglycolic acid resin.

EXAMPLES

Hereinafter, the present invention will be described more specifically based on Examples and Comparative Examples. The characteristic values disclosed in this specification including Examples described later are based on values measured according to the following methods.

<Weight-Average Molecular Weight (Mw)>

For measurement of the weight-average molecular weights (Mw) of the polyglycolic acid (PGA) and polylactic acid (PLA), each sample of 10 mg was dissolved in hexafluoroisopropanol (HFIP) containing sodium trifluoroacetate dissolved therein at a concentration of 5 mM to form a solution in 10 mL, which was then filtered through a membrane filter to obtain a sample solution. The sample solution in 10 µL was injected into the gel permeation chromatography (GPC) apparatus to measure the molecular weight under the following conditions. Incidentally, the sample solution was injected into the GPC apparatus within 30 minutes after the dissolution.

<GPC Conditions>
Apparatus: Shimadzu LC-9A,
Column:HFIP-806M×2(series connection)+Pre-column: HFIP-LG×1
Column temperature: 40
Elution liquid: An HFIP solution containing 5 mM of sodium trifluoroacetate dissolved therein
Flow rate: 1 mL/min.
Detector: Differential refractive index meter
Molecular-weight calibration: A calibration curve was prepared by using five standard molecular weight samples of polymethyl methacrylate having different molecular weights (made by POLYMER LABORATORIES Ltd.) and used for determining the molecular weights.

<Melt Viscosity>

The melt viscosity of polyglycolic acid was measured as follows based on JIS-K7199. An orifice with a diameter of 1 mm and a length of 10 mm was set to a semi-automatic capillary rheometer (made by Yasuda Seiki Seisakusho, Ltd.) and after a temperature increase to 270, a sample resin having been fully dried in advance was charged into the cylinder. After a preheating for 300 seconds, a viscosity was measured at a shear rate of 120 $sec^{-1}$.

Example 1

Polyglycolic acid (PGA) (melt viscosity: 600 Pa-s@270, 120 $second^{-1}$, made by Kureha Corporation) was supplied to an injection molding machine ("SAV-100-75", made by Sanjo Seiki Seisakusho K.K.) and melt-kneaded at a cylinder temperature of 250, to prepare a PGA ball of 0.5 inch (about 13 mm) in diameter by a mold (an ordinary split mold having a horizontal joining boundary for injection molding) set at 100. Subsequently, the above-prepared 0.5 inch-dia. PGA ball 12 was disposed as a core on three cylindrical support pins 13 each having a cross section of 1.5 $mm^2$ in a lower mold 10b of a mold 10 for vertical insert-injection as shown in FIG. 1, and an upper mold 12b equipped with similarly three support pins 13 was caused to descend to close the mold, thereby holding the PGA-ball core 12 at a substantially central position in the resultant cavity 11. In this state as shown in FIG. 1, the mold temperature was set to 100 and the same PGA as the above was supplied to the vertical injection molding machine to be melt-kneaded at a cylinder temperature of 250 and injected into a 1.5 inch-dia. cavity 11 of the above-mentioned mold. Then, almost simultaneously with completion of the injection, the support pins 13 of the upper and lower molds were retreated to the inner surface positions of the mold. After the completion of injection, the product was cooled for 35 sec. while kept in the mold, and then the mold was open to recover a 1.5 inch-dia. laminate ball formed by insert molding, which was free from deformation due to sink as a result of visual observation. Moreover, when some of a plurality of lamination balls thus prepared were cut into halves to observe the insides, voids were not recognized. Unevenness on the obtained lamination ball corresponding to the gate, parting line and support pins of the mold, was removed by a cutter and polished to be smoothed.

Example 2

A ball of 1.5 inches in diameter was prepared by insert molding as in Example 1, and then insert molding was again performed in the same manner as in Example 1 except for using the 1.5-inch ball as a spherical core 12 and using a mold 10 having a cavity of 2.5 inches in diameter for the insert molding.

Example 3

Insert molding was performed in the same manner as in Example 1 except for using as a surface layer material a 70/30 (by weight) mixture of the same PGA and a glass fiber (GF) ("GL-HF" made by Owens Corning; shorter-axis diameter: 10 µm, fiber length: 3 mm) to obtain a 1.5 inch-dia. laminate ball having a core of PGA alone and a surface layer of glass fiber (GF)-incorporated PGA.

Example 4

Insert molding was performed in the same manner as in Example 1 except for using as a core-forming material a polylactic acid (PLLA, "4032D" made by Nature Works LLC, Mw (weight-average molecular weight): 260,000, Tmp (melting point): 170) instead of PGA to obtain a 1.5 inch-dia. laminate ball having a core of PLLA alone and a surface layer of PGA.

Example 5

Insert molding was performed in the same manner as in Example 1 except for using as a surface layer material a 70/30 (by weight) mixture of the same PGA and glass powder ("ASF-1340" by Asahi Glass Co. Ltd.; average particle size: 2 µm) to obtain a 1.5 inch-dia. laminate ball having a core of PGA alone and a surface layer of glass powder (GP)-incorporated PGA.

Example 6

Insert molding was performed in the same manner as in Example 1 except for using a 70/30 (by weight) mixture of the same PGA and a milled glass fiber (MF) ("EHF50-3" made by Central Glass Co. Ltd.; shorter-axis diameter: 11□, average fiber length: 50□) instead of PGA alone as a core material and a surface layer material to obtain a 1.5 inch-dia. laminate ball having a core and a surface layer, both made of milled glass fiber (MF)-incorporated PGA.

Comparative Example 1

A 1.5 inch-dia. ball made of a single layer of PGA alone was formed in the same manner as the preparation of the core PGA ball in Example 1 except for using the same PGA alone used in Example 1 as a sole molding material and an injection mold with an increased cavity diameter of 1.5 inches. A cooling time of 35 sec. was taken similarly as in Example 1 but the ball taken out of the mold was hot and therefore further cooled by dipping in water. The resultant ball was deformed by sink and, as a result of cutting into halves and observation of the interior, voids of about 1 cc were observed.

The outline of the above-mentioned Examples and Comparative Example is summarized in the following Table 1.

TABLE 1

|  | Example | | | | | | Comp. 1 |
| --- | --- | --- | --- | --- | --- | --- | --- |
|  | 1 | 2 | 3 | 4 | 5 | 6 |  |
| Core | PGA | PGA | PGA | PLA | PGA | PGA/MF | PGA |
| Diameter (inch) | 0.5 | 0.5 | 0.5 | 0.5 | 0.5 | 0.5 | 1.5 |
| Cooling time (second) | 35 | 35 | 35 | 35 | 35 | 35 | 35 + water cooling |
| Surface layer (Interlayer) | PGA | (PGA) | PGA/GF | PGA | PGA/GP | PGA/MF | — |
| Thickness (inch) | 0.5 | 0.5 | 0.5 | 0.5 | 0.5 | 0.5 | — |
| Cooling time (second) | 35 | 35 | 35 | 35 | 35 | 35 | — |
| Surface layer | — | PGA | — | — | — | — | — |
| Thickness (inch) | — | 0.5 | — | — | — | — | — |
| Cooling time (second) | — | 35 | — | — | — | — | — |
| Final diameter (inch) | 1.5 | 2.5 | 1.5 | 1.5 | 1.5 | 1.5 | 1.5 |
| Appearance | Good | Good | Good | Good | Good | Good | Void, sink |

INDUSTRIAL APPLICABILITY

As described above, the present invention allows production of a large-diameter ball sealer suitable for use in the hydraulic fracturing process (hydraulic fracturing) widely used for recovery of hydrocarbon resources by using a polyglycolic acid resin which is a biodegradable resin having good mechanical strengths and a good size designability at least as a surface-forming resin, through relatively simple steps and with good dimensional accuracy.

The invention claimed is:

1. A frac ball for use in hydrocarbon resource recovery, the frac ball to be used in combination with a ball seat placed in a casing in a wellbore and having an opening smaller than that of the frac ball, wherein the frac ball has a diameter of at least about 25 mm and a generally spherical entire structure consisting of two main layers, a spherical core and a surface resin layer covering the spherical core, the surface resin layer consisting of one or more surface layers stacked on each other, wherein each of the two main layers consists of a compression-resistant polyglycolic acid having a weight-average molecular weight in a range of 70,000 to 500,000 and exhibiting a melt viscosity (JIS-K7199) in a range of 200 to 1,500 Pa·s, when measured under conditions of a shear rate of $120\text{-sec}^{-1}$ at a temperature which is the melting point of the polyglycolic acid plus 50° C.

2. A set of frac balls for hydrocarbon resource recovery, the set of frac balls including a plurality of frac balls having different diameters within a range of about 12.7 mm to about 127 mm, at least one of the plurality of frac balls being a frac ball according to claim 1.

3. A method of processing a wellbore, the method comprising a cycle of steps including:
feeding a frac ball along with a working fluid to a ball seat which has an aperture and has been disposed at a predetermined position in an elongated frac sleeve inserted into a wellbore formed in a formation, thereby sealing the aperture to form a seal section for intercepting the working fluid; and causing the working fluid to flush through a hole formed in a frac sleeve wall at a predetermined position right above the seal section, thereby digging a wellbore inner wall adjacent to the hole to form a perforation thereat; and then decomposing the frac ball in its place, wherein the frac ball is a frac ball according to claim 1.

4. A method of processing a wellbore, the method comprising:

disposing a plurality of ball seats at predetermined intervals in an elongated frac sleeve inserted into a wellbore, the plurality of ball seats having respective apertures of respective diameters increasing gradually from a downstream side to an upstream side of the frac sleeve; and feeding into the frac sleeve a work fluid and a plurality of frac balls having successively increasing diameters to perform fracturing cycles each including formation of a seal section and formation of a perforation in a wellbore inner wall successively from the downstream side, wherein at least one of the plurality of frac balls a frac ball according to claim 1.

* * * * *